Sept. 9, 1958   C. W. PUNTON ET AL   2,851,388
PROTECTIVE SHIELD
Filed April 26, 1954

INVENTORS.
Charles W. Punton and
BY Joseph R. Fisher.
ATTORNEY 2,851,388

PROTECTIVE SHIELD

Charles W. Punton, Wilkinsburg, and Joseph R. Fisher, Penn Township, Pa., assignors to Mine Safety Appliances Company, Pittsburgh, Pa., a corporation of Pennsylvania Application April 26, 1954, Serial No. 425,466

1 Claim. (Cl. 154—2.74)

This invention relates to protective shields, and more particularly, to transparent eye and face protective devices for use in gas masks, goggles, safety hoods, face shields and the like.

According to the invention, shields of good optical qualities and impact strength are constructed of a laminate of one or two discontinuous layers of relatively rigid transparent material and a layer of flexible transparent plastic. All of the layers are of relatively good optical material and contain a minimum of distorting properties. The rigid layers provide the shield with extremely good impact strength and scratch resistant qualities to protect the eyes and/or face of the wearer, and the interrupted portion of the rigid layers, together with the pliable layer of plastic, permit the bending of the shield at various portions in order that the shield may be easily fabricated for attachment to various shapes encountered in gas masks, hoods, goggles and face shields and facilitate storage and handling of the device.

It is among the objects of the invention to provide a protective shield having good optical qualities, improved impact strength and which can be manipulated readily for attachment to other devices or used by itself.

A further object is to provide a protective shield which may be readily and inexpensively fabricated and may be folded for the ease of storage without permanent distortion, and is not readily susceptible to surface marking.

Further objects and advantages will be apparent from the foregoing specifications and annexed drawing in which.

Figure 1:
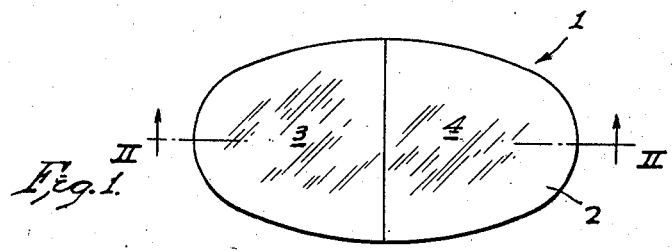
Fig. 1 shows a plan view of a protective shield according to the invention.
Figure 2:
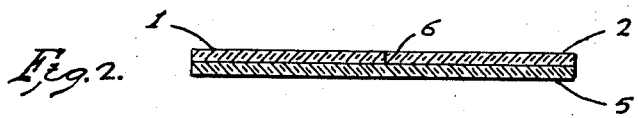
Fig. 2 is a sectional elevation of the shield shown in Fig. 1 taken along line 2—2 thereof.

The protective shield 1, shown in Figs. 1 and 2, is of a laminate construction comprising a discontinuous sheet or layer of a rigid transparent material 2 forming similar portions 3 and 4 superimposed on a continuous sheet or layer of pliable transparent plastic 5. The rigid material 2 may be composed of any of the well-known transparent plastic compositions which are optically suitable or glass and provides the necessary impact and scratch resistant qualities to the face shield 1. Normally, the rigid material will constitute the outer layer of the shield and the pliable material will constitute the inner layer since the latter is preferably positioned adjacent the wearer's face. The continuity of layer 2 is broken to provide a bend line 6 in order that the pliable layer 5 may be folded upon itself or bent to any preferred lesser degree. Bend line 6 may be made of any desired width. For example, it may be desirable to widen the bend line whereby the portions 3 and 4 are placed in a predetermined spaced relationship in order to permit limited or full bending of the shield in a direction opposite to that mentioned above.

Thus, it is seen that, by the above-described construction of the shield, the eyes and/or face of the wearer will be protected from any scattered fragments which normally would be injurious to the wearer since the impact strength of the rigid layer is such to withstand relatively hard blows. Also, this layer is not easily marked, and therefore, maintains good optical qualities in the shield for long periods of use. Furthermore, the shield may be manipulated to various angular positions without temporary or permanent distortion of vision or of the shield per se. A further important advantage is that, should the rigid layer be of material that shatters under sharp excessive blows, the pliable layer will function to prevent the shattered material from injuring the wearer.

Figure 3:
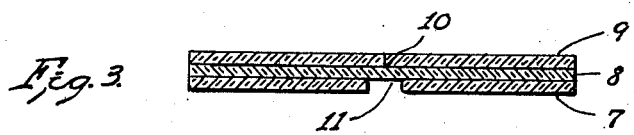
Fig. 3 is a sectional elevation similar to Fig. 2 but showing a modified form.

If the pliable layer of the shield is not usually exposed to detrimental foreign particles and the shield is handled with ordinary care, the device shown in Figs. 1 and 2 will be very serviceable. However, where the pliable layer is exposed or rough handling is expected, discontinuous rigid transparent layers 7 and 9 may be superimposed on both sides of the pliable layer 8 as shown in Fig. 3. In this modification, the bend lines 10 and 11 may be similar to bend line 6 or bend line 11 may be wider as shown in order to permit layer 7 to be folded toward itself.

Should it be desired, both bend lines 10 and 11 may be identical and of such width to permit folding of either rigid layer upon itself. Such a construction will allow reversibility and added flexibility to the shield, particularly from production and assembly standpoints.

Figure 4:
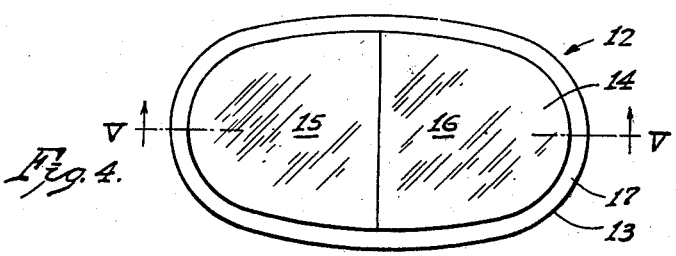
Fig. 4 is a plan view of a further modified shield.
Figure 5:
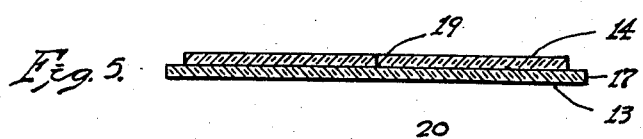
Fig. 5 is a sectional view taken along line 5—5 of Fig. 4.
Figure 6:
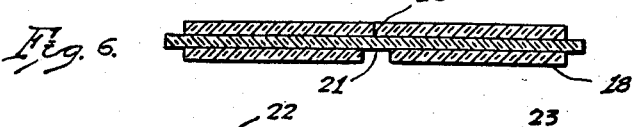
Fig. 6 is a further modification in sectional elevation similar to the form shown in Fig. 5.

As shown in Figs. 4 and 5, shield 12 is structurally different from shield 1 only in that it comprises a pliable layer 13 extended peripherally of the discontinuous rigid layer 14 forming portions 15 and 16 and providing a peripheral edge 17. This peripheral edge 17 permits a means for attaching the shield to a circumscribing surface such as would be found, for example, in a gas mask or safety hood. The edge 17 may be cemented, sewed or attached in some such similar manner to the circumscribing surface. Experience has proven that it is difficult to attach a shield to a protective mask or hood when these devices partially surround or circumscribe the shield since usually the fit between the shield and attaching surface is not sufficiently perfect. Consequently, when attached, the shield may be slightly deformed and vision through the shield will be distorted. Such difficulties are remedied by providing a pliable peripheral edge 17 on the shield which, due to its flexible nature, can be manipulated to compensate for attachment irregularities and prevent distortion of the central portion of the pliable layer 13 and the attendant rigid portions 15 and 16. The modified form of the invention shown in Fig. 6 is similar in structure to and function of the shield shown in Figs. 4 and 5 with the addition of a discontinuous rigid layer 18 on the other side of the pliable layer serving the same purpose as described above regarding layer 7 of Fig. 3. The bend lines 19, 20 and 21 shown in Figs. 4, 5 and 6 may be of the various forms shown in Figs. 1, 2 and 3 and described relative thereto or may be modified as mentioned above.

Figures 7, 8:
Figs. 7 and 8 are still further modifications shown in fragmentary sectional elevation.

As may be noted in Figs. 7 and 8, the medial portion of any of the shields shown in Figs. 1 through 6 may be so constructed whereby the pliable layer is extended into the bend line to space the rigid layer portions. Fig. 7 shows the extended plastic at 22 for use in the shields shown in Figs. 1, 2, 4 and 5 above, and Fig. 8 shows the plastic extended in both directions at 23 and 24 for the shields shown in Figs. 3 and 6. Shields fabricated with extended portions 22, 23 and 24 have the disadvantage of limited bending but have the distinct advantage of presenting an uninterrupted surface whereby fewer edges are exposed to scattered fragments and dirt, and provide a more pleasing appearance.

The various layers mentioned may be fused or cemented together by well-known fabrication methods, and the materials can be of any desired tint or color and composed of various optically suitable compositions. Further, the shield may be made into many various shapes and sizes, and the layers may obviously be of various relative thicknesses.

Having explained the principle of the present invention and having illustrated and described what is considered to be the best embodiments, it is understood that, within the scope of the appended claim, the invention may be practiced otherwise than as specifically illustrated and described.

We claim:

A portable protective shield adapted to be worn for personal protection of the user comprising a laminate of optical layers of transparent rigid and normally inextensible transparent pliable materials, said rigid material being interrupted along a single predetermined line forming spaced portions, and said pliable material extending across and in between said portions forming a bend line for said pliable material at said predetermined line.

References Cited in the file of this patent

UNITED STATES PATENTS

| | | |
|---|---|---|
| 1,929,892 | Kellner | Oct. 10, 1933 |
| 1,930,740 | Desagnat | Oct. 17, 1933 |
| 1,992,249 | Snyder | Feb. 26, 1935 |
| 2,162,598 | Atwood | June 13, 1939 |
| 2,679,467 | Sherts | May 25, 1954 |
| 2,721,157 | Martin et al. | Oct. 18, 1955 |